(12) United States Patent
Perrick

(10) Patent No.: US 7,963,066 B2
(45) Date of Patent: Jun. 21, 2011

(54) FISHING LURE

(76) Inventor: James D. Perrick, Sandy, UT (US)

( * ) Notice: Subject to any disclaimer, the term of this patent is extended or adjusted under 35 U.S.C. 154(b) by 250 days.

(21) Appl. No.: 12/288,856

(22) Filed: Oct. 24, 2008

(65) Prior Publication Data

US 2010/0101138 A1    Apr. 29, 2010

(51) Int. Cl.
*A01K 85/00* (2006.01)
*A01K 85/18* (2006.01)
*A01K 85/02* (2006.01)

(52) U.S. Cl. .................. 43/42.47; 43/42.09; 43/42.4

(58) Field of Classification Search ............ 43/42, 42.1, 43/42.22, 42.4, 42.41, 42.42, 42.47, 42.02, 43/42.03, 42.15, 42.5, 42.52, 42.36, 42.39
See application file for complete search history.

(56) References Cited

U.S. PATENT DOCUMENTS

| | | | | |
|---|---|---|---|---|
| 956,872 A * | 5/1910 | Alger | ............. | 43/42.47 |
| 1,599,763 A * | 9/1926 | Head | ............. | 43/42.09 |
| 1,723,193 A * | 8/1929 | Mclaughlin | ............. | 43/35 |
| 2,694,876 A * | 11/1954 | Grasser | ............. | 43/42.09 |
| 3,317,167 A * | 5/1967 | Becker et al. | ............. | 248/73 |
| 3,344,549 A * | 10/1967 | Peters et al. | ............. | 43/42.11 |
| 4,738,047 A * | 4/1988 | Ryan | ............. | 43/42.25 |

* cited by examiner

*Primary Examiner* — David J Parsley
*Assistant Examiner* — Danielle Clerkley
(74) *Attorney, Agent, or Firm* — M. Reid Russell

(57) ABSTRACT

A fishing lure that includes a bait head, bait body and an attachable action lip, where the lure can provide a realistic swimming action or a twitching or jerking motion when used for jigging. The action lip is mounted in a bowed attitude between a bait head rearwardly pointing lip stop wire and at a lip center keyhole opening that is fitted onto an eyelet that extends from the bait head nose, where the lip stop wire is mounted to extend rearwardly from a bait head rear lower edge, with the bait head nose eyelet to receive a fishing line attached thereto.

11 Claims, 5 Drawing Sheets

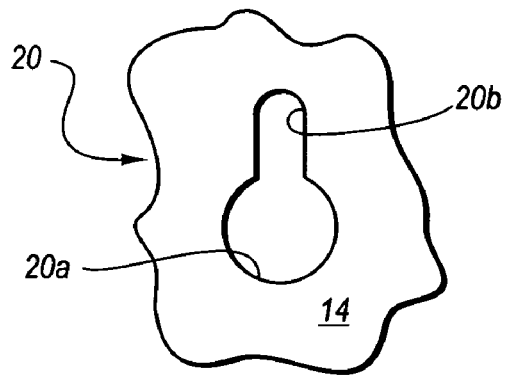
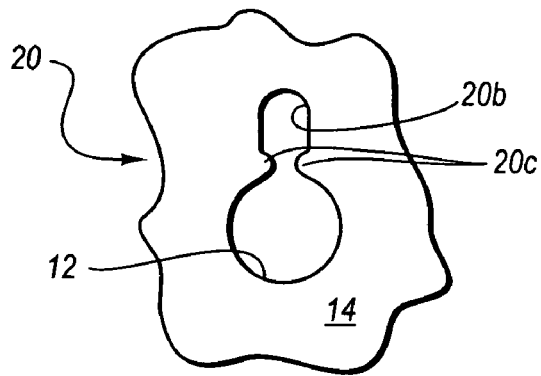
FIG. 8A          FIG. 8B
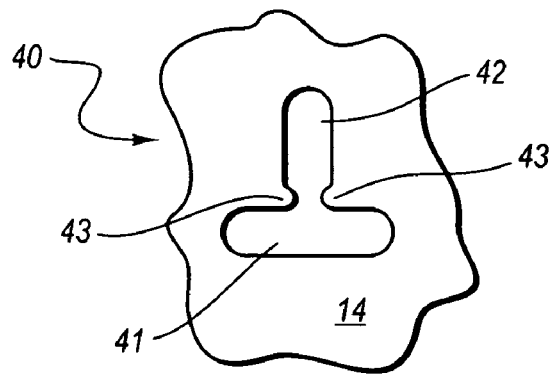
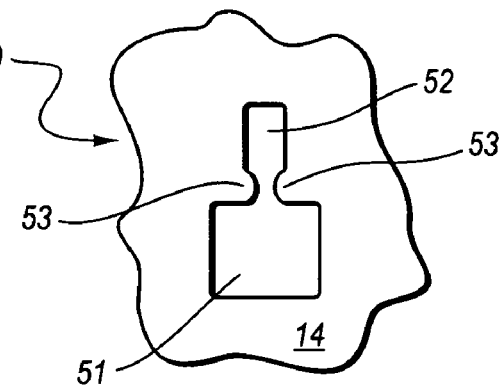
FIG. 8C          FIG. 8D

FISHING LURE

BACKGROUND OF THE INVENTION

1. Field of the Invention

This invention relates to fishing lures, and in particular to a fishing lure that provides different lure actions emulating an upward fluttering and swimming motions when pulled through the water and provides for use of a variety of easily changeable bait bodies.

2. Prior Art

The present invention is a recreational fishing lure that is capable of creating different motions to simulate a swimming bait when pulled through water or fluttering motion when lifted and dropped into the water. Another key feature of the present invention is that it affords the angler the ability to easily change the bait components to provide the different motions and to change the appearance of the bait.

Presently a number of fishing lures are on the market that provide a wobbling fishing lure. Where other such fishing lures created different motions, prior to the invention, there has not been a lure that can create both motions of a wobbling fishing lure and jigging with the same lure. In practice, the lure of the present invention greatly increases an angler's choices of the type of lure and motions they can utilize for fishing. To provide which alternate motions the angler chooses, the fishing lure of the invention incorporates an attachable action lip that is easily installed on and removed from a bait, providing a single fishing lure that can be easily and quickly converted to different functions, configurations and colors for differing fishing conditions.

Heretofore, lures that create a wobbling realistic swimming action of a bait have employed a wiggle plate that is attached to the lure. Such wiggle plates have generally been permanently fixed to the fishing lure. Additional to the limitation of having the wiggle plate that is permanently installed and it is usually fixed onto the bottom of the lure and, therefore, it is a common characteristic of such lures that they will often snag on bottom grasses and debris.

Unlike other fishing lures, the lure of the invention can not only be used for trolling providing a realistic swimming action to the lure, it can also be used for jigging. In jigging the fishing lure is lifted and dropped at various intervals so as to produce a quick rise of the lure, followed by a slow flutter downwards. For promoting jigging, the lure of the invention is provided with a weighted head. Whereas, with earlier lures, if the angler wished to changes the type of motion created by the lure, they were required to change the lure.

Summarizing, the lure of the invention allows an angler to quickly and easily change the type of motion the lure is creating without changing the lure or bait type. In practice, to alter the lure to provide a desired motion, the angler need only install or remove an "attachable action lip" and change the location where the fishing line is attached to the lure. The attaching of the "attachable action lips" to common or popular baits allows for a use of baits that heretofore were not used to swim, or to have the capacity to swim. In addition, the present invention is designed to discourage the hook from snagging when pulled through weeds and is easily installable.

SUMMARY OF THE INVENTION

It is a principal object of the present invention to provide a sport fishing lure that will afford an angler with the ability to create, utilizing a single lure, both wobbling motion for a swimming action when pulled through water, and will, with the same lure, allow the angler to use the fishing lure for jigging.

Another object of the present invention is to provide a sport fishing lure that allows an angler to quickly change the style of the lure, bait, body or flies.

Still another object of the present invention is to provide a lure that includes an easily detachable lip to provides a swimming action to the lure, where the bottom of the lip to bait attachment is designed to have a sled like appearance that allows the lure to slip through bottom plants and off of obstructions without snagging.

The present invention is a fishing lure that includes a head that can be weighted or non-weighted, and has a barbed hook extending from a rear or stem of the lure head. On the rear end of the head bottom section is arranged a lip stop wire that is bent away from the head and has a dog leg bend formed at a mid-section back towards the head. The lure head includes two lure eyelets or two points of attachment for a fishing line. The first lure eyelet is located on the forward or nose end of the head, and the second lure eyelet is located on the top of the head.

The invention includes an "attachable action lip" for mounting to the head of the lure that is made from any semi-flexible or resilient material. In practice, a general material as has been used is a plastic or metal. The lip preferably has a bullet shape with a rounded head and flat stem, and, in the middle of the lip, a keyhole lock slot is formed to lock to a shaft of the eyelet that extends from the head nose end. An opening or slot is formed at the bottom or stem end of the lip. To hold the lip in place, the opening or slot in the lip stem end is fitted over and travels along a lip stop wire that is angled downwardly and rearwardly from the lure head, and the lip is bowed to allow for positioning of the lip keyhole over and onto the lure eyelet prior to attaching a line to that eyelet. The lip thereby is bowed into the direction of lure travel through water, and, as the lip stop wire extends away from the direction of lure travel through the water, it will not snag on rocks, branches, weeds or other debris. When pulled through the water the upward angle of the bowed lip makes the lure naturally swim upwardly, helping to keep the lure from dragging on the bottom. The lip stop wire is generally cast in place in the lure head formation process, and points to the rear of the lure.

The angler may choose which lure eyelet to attach the fishing line depending upon the type of action they configure the lure to provide. To create a realistic swimming action the fishing line is attached to the forward lure eye after the attachable lip has been fitted in place. If the angler chooses to use a traditional jigging action, with no swimming action, the fishing line is attached to the lure eyelet located on top of the lure head.

Several different styles of lures, baits, bodies, or flies may be attached to the head.

DESCRIPTION OF THE DRAWINGS

The invention may take physical form in certain parts and arrangement of parts, and a preferred embodiment of which will be described in detail in this specification is illustrated in the accompanying drawings, which form a part hereof.

FIGS. 8A, B, C and D show various arrangement of the keyhole lock slots that will each accommodate a lure head eyelet, with the lure eyelet will pass through the action lip lower opening and into a connected slot that will prevent reverse passage of the lure eyelet out from the slot of the keyhole lock slot.

DETAIL DESCRIPTION

The invention is in a combination of hook bait with an attachable action lip, and its arrangement for fitting onto a lure head in a bowed attitude. The invention includes the combination of a lip stop wire that extends rearwardly from the head stem section and is fitted through a hole or slot formed through the stem portion of the attachable action lip, that also includes a keyhole lock slot formed through the mid-portion of the attachable action lip that a head eyelet is fitted through prior to attachment of a fishing line to that eyelet. The invention provides an angler with the ability to create both a wobbling swimming action and a jigging motion to the lure when it is pulled or moved up and down in water. The lure also has, by the attachment arrangement of the attachable action lip an advantage of limiting the likelihood that the lure will become snagged.

Figure 1:
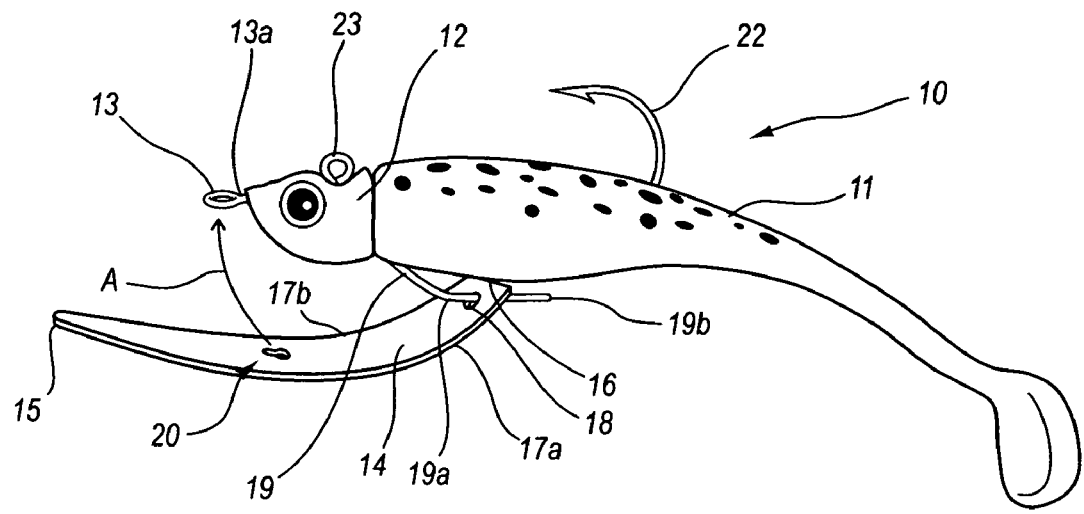
FIG. 1. shows a side elevation perspective view of the fishing lure of the invention as having an attachable action lip, and a lip stop wire, that extends rearwardly from a bait body, with the lip stop wire end shown as having been fitted through a hole in the lip stem section, and showing, at arrow A, the action lip being bowed as arc C, as shown also in FIG. 5, for fitting a lip keyhole lock slot, that is formed in the lip mid-section, over a bait head nose eyelet end.
Figure 2:
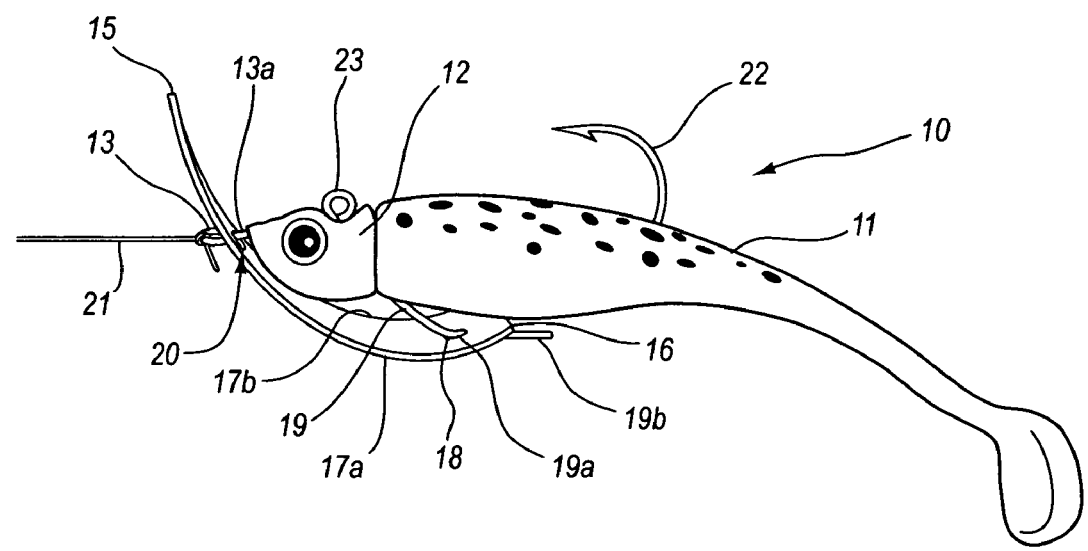
FIG. 2. shows the lure of FIG. 1 after installation of the action lip, with the lip shown as having been bowed and the lip keyhole lock slot as having been fitted over the lure head nose eyelet, and with the action lip shown as having been urged over the eyelet and locked into the keyhole slot that then received a fishing line secured thereto.

A first embodiment of a fishing lure 10 of the invention is shown in FIGS. 1 and 2, with, in FIG. 1, the lure 10 is shown in side elevation as including a bait body 11, a head 12 that includes an eyelet 13 extending axially out from its forward end or nose end, a lip stop wire 19 that extends rearwardly from the head stern, and shows an attachable action lip 14, hereinafter referred to as lip 14, that is shown formed with a rounded bow end 15 and a flat straight stem end 16 between essentially parallel sides 17a and 17b. FIGS. 1 and 2 show the lip 14 as including in hole 18, that can alternatively be a slot, that is located along the lip longitudinal axis, and space apart from the stem end 16 that has received the end of the lip stop wire 19 fitted therethrough, below a bait body 11. The lip stop wire 19 is shown as having been fitted through the lip hole 18 or slot. Whereafter, the lip 14 is slid along the lip stop wire 19 to an upward dog leg bend 19a formed in the lip stop wire 19. Shown in FIG. 1, the lip 14 is bowed, as illustrated by arrow A, to bring a lip keyhole lock slot 20 that has been formed along the lip longitudinal axis, that is spaced apart from the lip bow end 15 to be formed in the lip mid-section, into alignment with, so as to fit over, the bait head eyelet 13, as shown in FIG. 2. The keyhole lock slot 20 provides, as set out hereinbelow, for a locking of the lip 14 bow end onto the bait eyelet 13 in a bowed attitude, as illustrated at arc C in FIG. 5A, whereafter a fishing line 21 is tied to the bait eyelet 13 is used to pull the lure 10 through water. The combination of the bait and bowed lip to provide a realistic swimming action to the lure 10.

Figure 6:
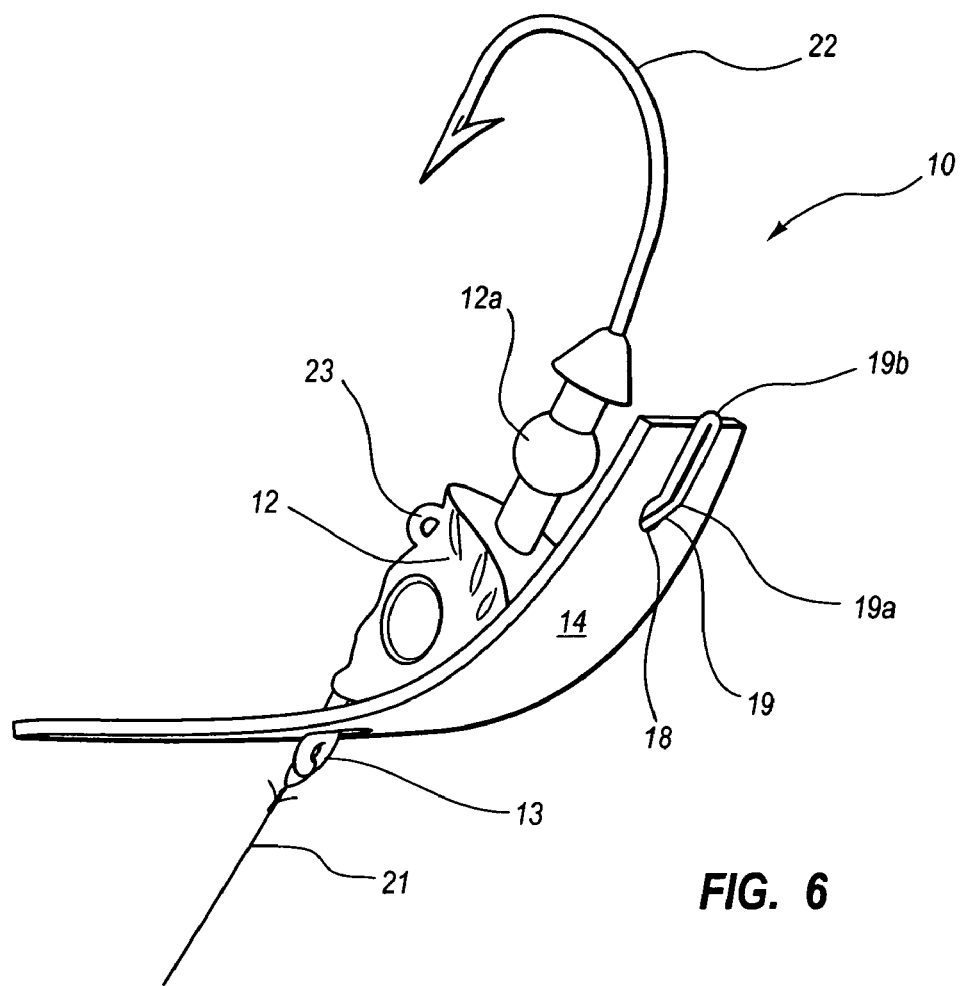
FIG. 6. shows the lure of FIG. 1 showing the action lip installed on a lure head and held in place in a bowed attitude between the lip stop wire that has been fitted through the hole in the lip stem portion and shows the lure eye fitted through the keyhole lock slot, and shows a fishing line attached to the lure eyelet.

Shown in FIGS. 1 and 2, the bait body 11 has a minnow shape and shows a hook 22 extending out from the back of the bait body 11. FIG. 6 is shown the bait head 12 as including an attachment stem 12a extending rearwardly along the head longitudinal axis that includes the hook 22 extending from the rear end thereof. The attachment stem 12a is for receiving the bait body 11 fitted thereover. The bait head 12 is shown in FIGS. 1, 2, 3, 6 and 7, as including the eyelet 13 that extends from the head nose end, and may include an eyelet 23 extending outwardly from the head 12 top. The eyelet 13 provides for mounting of the lip 14 and receives a fishing line 21 attached thereto when the lure 10 is pulled through water and provides a realistic swimming action, and, with the lip 14 removed, the eyelet 23 receives a fishing line connected thereto when the lure 10 is used a traditional jigging action with the lure 10 lifted up and down.

The heads 12 of FIGS. 1, 2 and 6, may be weighted or non weighted, and painted and, of course, each includes the nose eyelet 13 and the lip stop wire 19 for mounting the lip 14 and the location of which the fishing line 21 point of attachment to either the nose eyelet 13 or eyelet 23 depending upon the type of motion or action the angler wishes to create with the lure 10.

Figure 3:
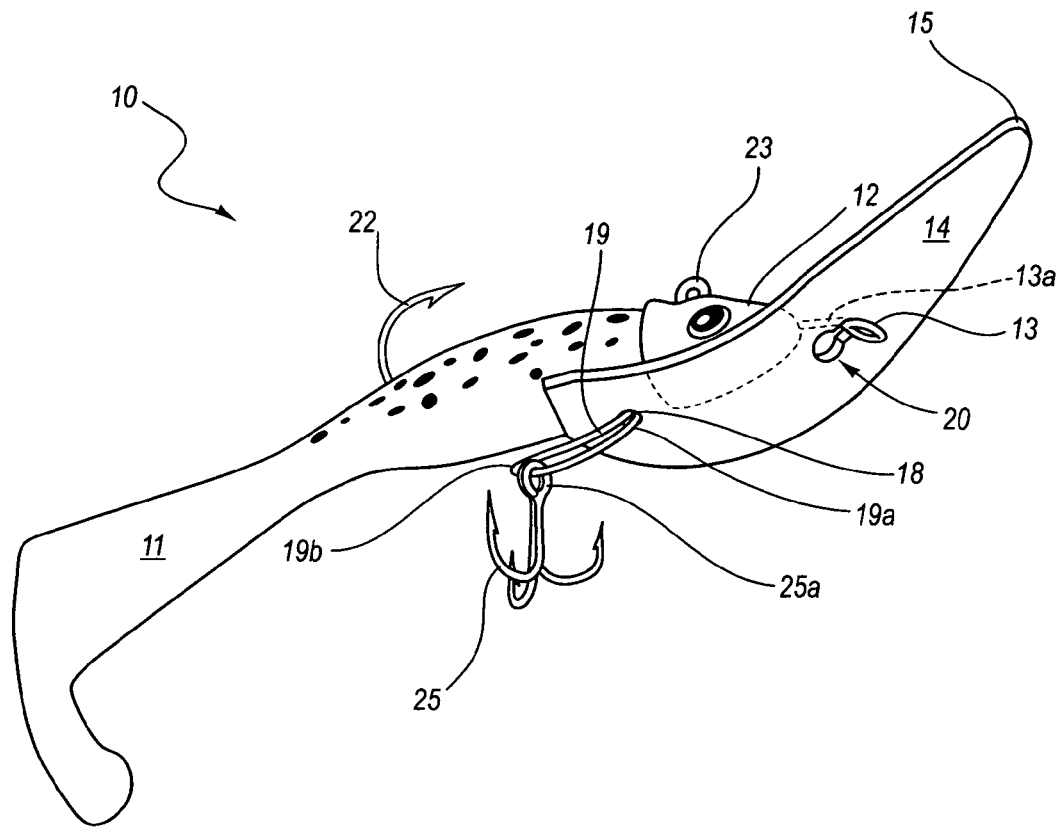
FIG. 3. shows a bottom plan view of the lure of FIG. 2 showing a perspective view of the action lip installed on the bait and showing an added barbed hook installed to the lip stop wire whose end is formed into a loop, with the lure to receive a fishing line attached to the lure eyelet.
Figure 7:
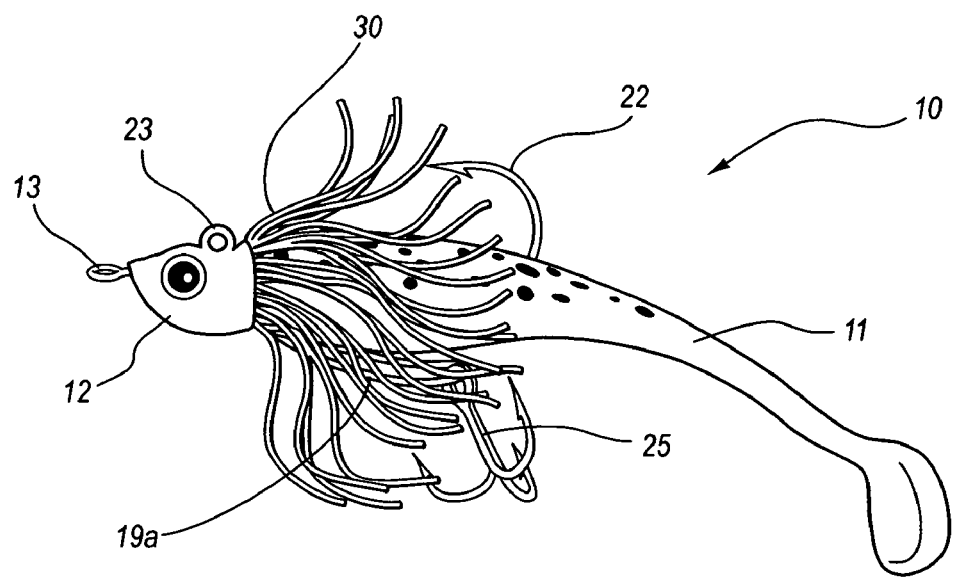
FIG. 7. shows the lure of FIG. 1, less the action lip and is shown as including flexible strings or ribbons extending rearwardly from around the lure head neck area that ungulate when pulled through water on an attached fishing line.

The lip stop wire 19, shown in FIGS. 1 through 3 and 6, is mounted into the bottom rear or stem portion of the head 12, extending rearwardly therefrom and, as shown, and is bent slightly upwardly at 19a, to provide a lip stop wire end section 19b that is approximately parallel to an undersurface of the bait 11, shown in FIGS. 1 through 3. The lip stop wire can be a single wire as shown in FIGS. 1 and 2, or may be a double wire that is folded upon itself at the end of the lip stop wire end section 19b, as shown in FIGS. 3, 6 and 7, to provide for attachment of a second barbed hook 25, as shown in FIGS. 3 and 7. The lip stop wire 19 is for fitting through the lip stem hole 18 to hold the lip stem in place as the lip 14 is bowed, as shown at arrow A in FIG. 1, to where the lip keyhole lock slot 20 aligns with, for fitting over the bait head eyelet end 13, as shown in FIG. 2. The lip stop wire 19 preferably extends at an angle of between thirty and sixty degrees from the head 12 undersurface, aligned with the longitudinal axis of the head 12, and the bait head eyelet 13 extends axially out from the nose of the head to receive the lip bow keyhole lock slot 20 fitted thereover.

Figure 4:
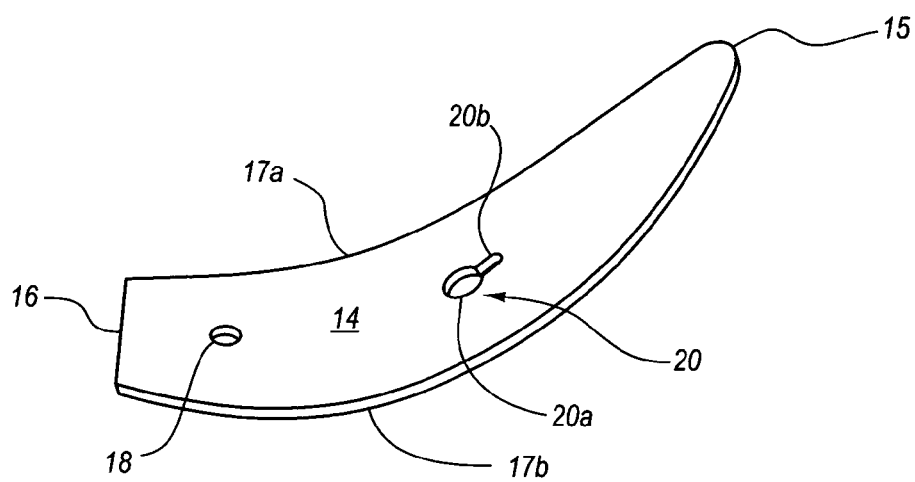
FIG. 4. shows a profile perspective view of the action lip removed from the lure of FIG. 1, showing the lip keyhole lock slot as having a lower circular opening with a slot extending upwardly therefrom and centered on the action lip longitudinal axis, with the lower circular opening to accommodate the bait forward eyelet fitted through, with, upon release of the action lip bow, the action lip will relax and the neck or shank of the forward eyelet will travel into the keyhole lock slot, locking the action lip to the bait head.

FIG. 4 shows the lip 14 of FIGS. 1 through 3, that include the lip stem hole 18 that, it should be understood can be a slot, and keyhole lock slot 20. As shown, the stem hole 18 is a round hole of a diameter or width to accommodate bait head lip stop wire slid therealong, and the keyhole lock slot 20 includes a round lower hole 20a that is intersected by a straight slot 20b. The keyhole lock slot 20 round hole 20a has a diameter sufficient to accommodate the bait head eyelet end 13 fitted therethrough, and the straight slot 20b will accommodate the bait head eyelet end stem or body 13a traveling therealong. In practice, with the lip stop wire 19 fitted through the stern hole 18, that alternatively can be formed as a slot, to approximately the bend 19a, and after the bowed lip keyhole lock slot 20 lower hole 20a receives the bait head eyelet end 13, the lip bow is relaxed, causing the bait head eyelet end 13 stem or body 13a to slide along the keyhole lock slot straight slot 20b to the slot end, locking the lip 14 onto the bait.

Figure 5A:
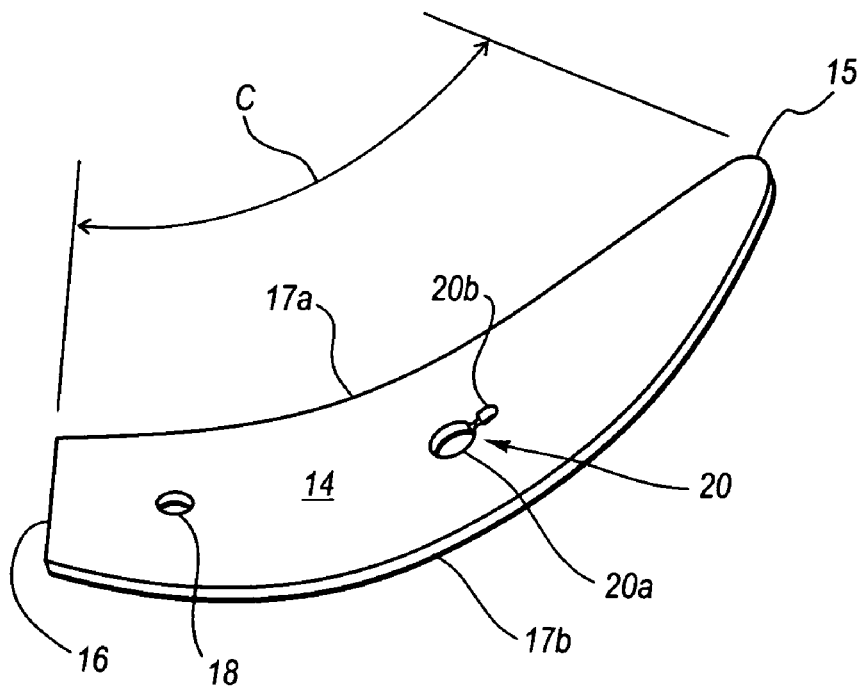
FIGS. 5A and 5B. show the action lip removed from the lure of FIG. 1, showing the approximate shaped of the pre-cast lip, with the keyhole lock slot shown as being necked inwardly forming opposing rounded shoulders, above the junction of the circular opening with the slot, with which shoulder, the slot of the keyhole lock slot width thereacross is only slightly greater than the diameter of the neck or shank of the bait eyelet, and shows the corners of the lip stem as having been removed.
Figure 5B:
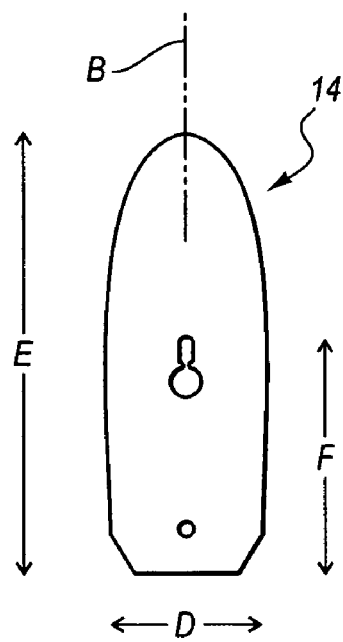

FIGS. 8A through 8D show variations of the arrangement of the keyhole lock slot 20 to include, in FIG. 8A, the keyhole lock slot 20 as shown in FIGS. 3 and 4, that includes the lower hole 20a and intersecting straight slot 20b. FIG. 8B shows the keyhole lock slot 20 as shown in FIGS. 5A and 5B that includes the lower hole 20a, the straight slot 20b and the opposing shoulders 20c formed at the junction of the lower hole 20a and bottom end of the straight slot 20b. The keyhole lock slots 20 of FIGS. 8A and 8B are essentially the same except for the opposing shoulders 20c. Distinct therefrom, a keyhole lock slot 40 is shown in FIG. 8C as consisting of a lateral slot 41 that is of a length to allow passage of the bait head eyelet end 13, and intersects with, and forms an inverted cross with the longitudinal slot 42 that incorporated opposing shoulders 43 formed at the junction of the lateral and longitudinal slots. The crossing slots allow for passage of the bait head eyelet 13 end and body or stem 13a to pass therebetween, but will resist back passage of that body or stem 13a. FIG. 8D shows still another embodiment of a keyhole lock slot 50 that includes a square lower hole 51 that opens into a longitudinal shot 52 that includes opposing shoulder 53. Which keyhole lock slot 50 functions essentially like the keyhole lock slots of FIGS. 8A and 8B.

Shown in FIGS. 1 through 3 and 6, the lip stop wire 19 attaches at the stem end of the bait body head 12 to extend rearwardly therefrom, and is bent at 19a. The distance of the bend 19a from the bait head 12 is approximately one half the length of the slip stop wire 19. From the bend 19a the lip stop wire is essentially parallel to the longitudinal axis of the bait head 12. Shown in FIG. 3, the lip stop wire 19 can be constructed with a wire end 19b loop arrangement that allows for an attachment of a split ring mounting end 25a of a hook 25. The split ring 25 amounting end, as shown in FIG. 3, can be used to attach the additional hook 25, or can be included on other fishing devices, such as a weight, not shown. With the lip stop wire 19 pointing to the rear of the lure it is unlikely that the lure 10 will collect weeds or become snagged when pulled through water. Shown in FIG. 6, the head 12 includes a center body 12a that bait 11 attaches to and terminates in a stem portion that the barded hook 22 extends from.

The attachable action lip 14 is preferably made from a semi-flexible or resilient material. In practice, the preferred material that is used is a plastic or metal, and the lip has a width D, as shown in FIG. 5B, that is just larger than the lure bait 12. In practice, a lip having a width D off from one quarter (¼) of an inch to one and three quarters (1¾) of an inch have been used successfully, through, for some applications of lip having a greater or lesser width could be so used within the scope of this disclosure. When viewed from above, as shown in FIG. 5B, the lip 14 has a bullet shape with a squared off stem or transom 16, as shown in FIG. 5A, that the corners have been removed from. As shown in FIG. 5A, the lip preferably has a rounded bow or nose 15 and essentially parallel sides 17a and 17b, and has been bowed to approximately the attitude shown in FIGS. 2 and 3. Which bow is shown in FIG. 5A as an arc C that, in practice, is approximately one hundred twenty (120) degrees, but may be from eighty (80) to one hundred thirty (130) degrees within the scope of this disclosure. In practice, the bend may be partially precast into the lip 14, or the lip may be formed from a flexible material and bent to the desired attitude. Where the lip 14 is precast, the lip, the bow will have an arc of approximately ninety (90) degrees, and will be inherently stronger and crack resistant, will resist being deformed, will be easier for the angler to install, and will minimize bending fatigue as may occur due to repeated use. Shown in FIG. 5B, located along the center longitudinal axis B of the lip 14 are two openings consisting of, stern hole 18, that, it should be understood, can be a slot within the scope of this disclosure, wherethrough the lip stop wire 19 is fitted, and the keyhole lock slot 20. The keyhole lock slot, as set out above, receives the bait head eyelet 13 fitted therethrough, and provides for locking the eyelet body 13a therein until the lip is manually released. In practice, the keyhole lock slot 20 is located at approximately the lip midpoint along its center longitudinal axis B. The keyhole lock slot 20, as discussed above, can have a number of different shapes and sizes as shown in FIGS. 8A, 8B, 8C and 8D that all function similarly. Generally, each keyhole lock slot 20, as shown in FIGS. 8A and 8B, 40 in FIGS. 8C and 50 in FIG. 8D, will have a large opening at the bottom end, and the larger opening will connect, along the lip longitudinal axis, to a longitudinal slot, and may include opposing shoulders or protrusions. The shoulders or protrusions assist in holding the lip 14 onto the eyelet body 13a.

FIG. 5B shows the lip 14 as having a length E and a distance between the stem 16 and keyhole lock slot 20 as F. In practice, the distance F is preferably approximately half the length E. Though, however, it should be understood, that the length F can be from point four (0.4) to point six (0.6) the length E, within the scope of this disclosure.

As shown in FIG. 1, to assemble the lure 10, the lip 14 is attached to the lure head 12 by inserting the lip stop wire 19 end through the lip stop hole or slot 18 to where the bend 19a approximately aligns with the lower opening 18 of the lip 14. With the lip 14 slid along the lip stop wire 19, and with the lip bowed, as illustrated with arrow A, the keyhole lock slot 20 aligns with the forward eyelet 13.

In FIG. 2 illustrates the completion of the installation of the lip 14 to the bait head 12. In which lip installation, the lip 14 is bent back towards the bait head 12, aligning the keyhole lock slot 20 with the forward lure eyelet 13, and the forward lure eyelet 13 is inserted into the lower portion of the keyhole lock slot 20 opening 20a. Bowing pressure on the lip 14 bow end is released, causing the forward head eyelet 13 body or stem 13a to move past the keyhole lock slot 20 shoulders 20c, shown in FIGS. 5A, 5B and 8B, locking the forward head eyelet firmly in place in the keyhole lock slot 20.

With the lip 14 installed on the bait head 12 with body 11 attached, the lure 10, when pulled through water provides a realistic swimming action. In practice, when the lure 10 is pulled through water, the water contacts and pressed into the surface of the lip 14, loading the lip surface. The force of water on the lip 14 produces lip pivoting from one side to the other, with each pivot dumping water accumulated on the lip surface, causing the lure 10 to swing back and forth across the line 21, creating the appearance of swimming to the lure 10. To insure that the lip 14 will remain in a proper position, the lower portion the head 12 is formed to have a width that is slightly less than the width of the lip 14, and has a radius that will match the arc of the pre-bent the lip 14.

FIG. 7 shows the lure 10 less the lip 14 and includes streamers or tentacles 30 extending rearwardly from around the lure bait forward end, at the head 12 neck area. The streamers or tentacles 30 are examples of optional decorative accessories, and, it should be understood, that more than one, or other decorative accessories, can be fitted to the bait body that may or may not be colored, spotted, or the like, within the scope of this disclosure. So arranged, fishing line 21 can be attached to either the forward eyelet 13 with the lip attached, or to the upper lure eyelet 23 for providing a realistic swimming motion to the lure, or the lure can be used for jigging or casting. Jigging, of course, is the lifting and dropping of the lure at various intervals to produce a quick rise in the lure, followed by a slow flutter downwards.

The lure 10 of the invention that incorporates the lip 14 provides a sled like profile that allows the lure 10 to be pulled over rocks, branches, weeds and other debris. When pulled through water the upward angle of the lip makes the lure naturally swim upward helping to keep the lure from dragging on the bottom.

Herein is shown an embodiment of my invention in a fishing lure that allows an angler to create, with a single lure, different and distinct motions when the lure is pulled through, or moved up and down, in water. It will, however, be apparent to one knowledgeable or skilled in the art that the described embodiment and components thereof may incorporate changes and modification without departing from the general scope and subject matter of the invention. Which invention, it should be understood, is intended to include all such modifications and alteration in so far as they come within the scope of the appended claims and/or a reasonable equivalence thereof.

I claim:

1. A fishing lure comprising, a head that has a lure eyelet extending outwardly along a center longitudinal axis of a nose end of said head that includes a bait body mounting that extends rearwardly along said head center longitudinal axis and terminates in an end of a hook shaft, and said head also includes a single lip stop wire that connects to extend rearwardly from a lower rear end of said head and is bent upwardly, at approximately a mid-point thereof, towards, to align with and be essentially parallel to, said head center longitudinal axis; and a flexible action lip that has essentially a bullet shape with a round bow, flat stern and parallel sides that is formed from a flexible thin flat material to be pre-bowed, and said flexible action lip includes a hole formed along its longitudinal axis that is spaced apart from the stern and is to receive the end of said lip stop wire fitted therethrough, and includes a keyhole lock slot formed through and is centered in its mid-section along its longitudinal axis that is to receive said lure eyelet fitted therethrough to position said flexible action lip rounded bow above said head that, when a lip bowing force is released, a stem or body of said lure eyelet travels into and is held in a locking means of said keyhole lock slot until a bowing force is reapplied to said action lip.

2. The fishing lure as recited in claim 1, wherein the keyhole lock slot, from the action lip bow, consists of a lower first opening having a diameter to pass the lure eyelet fitted therethrough, and a slot that intersects the first opening and is formed along said action lip longitudinal axis and has a width that is greater than a stem or body of said lure eyelet and less than said lure eyelet end.

3. The fishing lure as recited in claim 2, further including rounded protrusions that are formed at the junction of the first opening and the slot, facing one another, with the distance apart of said protrusion selected to allow for a tight passage of the lure eyelet stem or body.

4. The fishing lure as recited in claim 1, further including a second eyelet attached to, to extend upwardly from, the top of the head, proximate to a rear edge of said head, and on said head center longitudinal axis.

5. The fishing lure as recited in claim 1, wherein the action lip is pre-bowed at an arc of less than one hundred twenty (120) degrees and is sufficiently flexible to allow for further bending to align the keyhole lock slot over the lure eyelet for fitting said lure eyelet into said keyhole slot, maintaining the action lip with a bow of approximately one hundred twenty (120) degrees of arc around a head undersurface.

6. The fishing lure as recited in claim 5, wherein action lip keyhole lock slot is formed through a mid section of said action lip, along the longitudinal axis and is at a distance from the stern end of said action lip that is from point four (0.4) to point six (0.6) the length of said action lip along its longitudinal axis.

7. The fishing lure as recited in claim 5, wherein the head undersurface is curved to accommodate the action lip in its bowed state attached between the keyhole lock slot mounting over the lure eyelet and at a point along the lip stop wire that is fitted through the action lip hole.

8. The fishing lure as recited in claim 7, wherein the lip stop wire is angled at approximately a forty five (45) degree angle downward from the longitudinal axis of the head, and is bent upwardly at approximately its midpoint to extend rearwardly from that and parallel to the center longitudinal axis of the head; and the wire is formed into a loop end.

9. The fishing lure as recited in claim 8, wherein the lip stop wire end is formed into a loop for attaching an eyelet end of a second barbed hook fitted thereto.

10. The fishing lure as recited in claim 1, wherein the head is weighted.

11. The fishing lure as recited in claim 1, further including at least one decorative accessory connected or formed in the lure bait.

* * * * *